United States Patent
Ebata

(10) Patent No.: US 12,521,093 B2
(45) Date of Patent: Jan. 13, 2026

(54) ULTRASOUND DIAGNOSTIC APPARATUS AND CONTROL METHOD OF ULTRASOUND DIAGNOSTIC APPARATUS

(71) Applicant: FUJIFILM Corporation, Tokyo (JP)

(72) Inventor: Tetsurou Ebata, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 88 days.

(21) Appl. No.: 18/484,084

(22) Filed: Oct. 10, 2023

(65) Prior Publication Data

US 2024/0081783 A1     Mar. 14, 2024

Related U.S. Application Data

(63) Continuation of application No. PCT/JP2022/017667, filed on Apr. 13, 2022.

(30) Foreign Application Priority Data

Apr. 30, 2021  (JP) ................. 2021-077944

(51) Int. Cl.
*A61B 8/00* (2006.01)
*A61B 8/08* (2006.01)

(52) U.S. Cl.
CPC ............ *A61B 8/466* (2013.01); *A61B 8/4245* (2013.01); *A61B 8/4483* (2013.01); *A61B 8/463* (2013.01);
(Continued)

(58) Field of Classification Search
CPC ..... A61B 8/466; A61B 8/4245; A61B 8/4483; A61B 8/463; A61B 8/465; A61B 8/5207;
(Continued)

(56) References Cited

U.S. PATENT DOCUMENTS 6,468,212 B1 * 10/2002 Scott ............... A61B 8/463
                                                   600/440
6,607,488 B1    8/2003 Jackson et al.
(Continued)

FOREIGN PATENT DOCUMENTS

CN     111449680 A  *  7/2020  .......... A61B 8/4218
JP     2013-146454 A    8/2013
(Continued)

OTHER PUBLICATIONS

International Search Report issued in PCT/JP2022/017667; mailed Jul. 12, 2022.
(Continued)

*Primary Examiner* — Kaitlyn E Sebastian
(74) *Attorney, Agent, or Firm* — Studebaker Brackett PLLC

(57) ABSTRACT

In an ultrasound diagnostic apparatus and a control method of the ultrasound diagnostic apparatus of the present invention, a tissue layer detection unit analyzes each of a plurality of two-dimensional ultrasound images to detect a tissue layer in a range from a body surface of an examination location to a predetermined depth. A normal vector calculation unit calculates a normal vector perpendicular to a tissue plane in a three-dimensional space on the basis of the tissue layer. A three-dimensional image generation unit generates a three-dimensional ultrasound image corrected such that the tissue plane is horizontal on the basis of the plurality of two-dimensional ultrasound images and the normal vector. A display control unit displays the three-dimensional ultrasound image on a monitor. As a result, even in a case where the ultrasound probe is in contact with the body surface in an inclined manner, the three-dimensional ultrasound image in which the inclination of the ultrasound probe is corrected.

20 Claims, 11 Drawing Sheets

(52) U.S. Cl.
CPC ............ *A61B 8/465* (2013.01); *A61B 8/5207* (2013.01); *A61B 8/54* (2013.01); *A61B 2562/04* (2013.01)

(58) Field of Classification Search
CPC ..... A61B 8/54; A61B 2562/04; A61B 8/0858; A61B 8/0891; A61B 8/429; A61B 8/4488; A61B 8/461; A61B 8/5215; A61B 8/483
See application file for complete search history.

(56) References Cited

U.S. PATENT DOCUMENTS

| | | | | |
|---|---|---|---|---|
| 2011/0282207 | A1* | 11/2011 | Hashimoto | ............ A61B 8/466 600/443 |
| 2014/0276062 | A1* | 9/2014 | Kondoh | ................ G06T 7/0012 600/443 |
| 2015/0374330 | A1* | 12/2015 | Murai | .................. A61B 8/0891 600/449 |
| 2019/0083064 | A1 | 3/2019 | Nguyen et al. | |
| 2019/0175143 | A1* | 6/2019 | Bai | ....................... A61B 8/4461 |
| 2020/0397409 | A1* | 12/2020 | Inoue | ................... A61B 8/0858 |
| 2021/0045717 | A1* | 2/2021 | Schwab | ................ A61B 5/1128 |
| 2022/0087644 | A1* | 3/2022 | Patil | ....................... G16H 40/63 |

FOREIGN PATENT DOCUMENTS

| | | | | |
|---|---|---|---|---|
| JP | 2013-169389 | A | 9/2013 | |
| JP | 2015-080570 | A | 4/2015 | |
| JP | 2017-035379 | A | 2/2017 | |
| JP | 2019-509856 | A | 4/2019 | |
| JP | 2019-208592 | A | 12/2019 | |
| JP | 7061232 | B2 * | 4/2022 | ........... A61B 8/0866 |
| WO | 2013051279 | A1 | 4/2013 | |
| WO | 2017094397 | A1 | 6/2017 | |
| WO | 2019187649 | A1 | 10/2019 | |

OTHER PUBLICATIONS

International Preliminary Report on Patentability (Chapter I) and Written Opinion of the International Searching Authority issued in PCT/JP2022/017667; issued Oct. 24, 2023.

* cited by examiner

ULTRASOUND DIAGNOSTIC APPARATUS AND CONTROL METHOD OF ULTRASOUND DIAGNOSTIC APPARATUS

CROSS-REFERENCE TO RELATED APPLICATIONS

This application is a Continuation of PCT International Application No. PCT/JP2022/017667 filed on Apr. 13, 2022, which claims priority under 35 U.S.C. § 119(a) to Japanese Patent Application No. 2021-077944 filed on Apr. 30, 2021. The above applications are hereby expressly incorporated by reference, in their entirety, into the present application.

BACKGROUND OF THE INVENTION

1. Field of the Invention

The present invention relates to an ultrasound diagnostic apparatus and a control method of the ultrasound diagnostic apparatus which have a function of generating and displaying a three-dimensional ultrasound image on the basis of a plurality of two-dimensional ultrasound images.

2. Description of the Related Art

For example, JP2019-208592A, JP2019-509856A, and JP2013-146454A disclose an ultrasound diagnostic apparatus that can generate both two-dimensional ultrasound images and three-dimensional ultrasound images. In a case where the three-dimensional ultrasound image is generated, for example, a plurality of two-dimensional ultrasound images are generated by performing transmission and reception of ultrasound beams while shifting an angle or a position of a scanning plane in an elevation direction, and a three-dimensional ultrasound image using the plurality of two-dimensional ultrasound images.

SUMMARY OF THE INVENTION

In a case of scanning an examination location of a subject, as illustrated in FIG. 14A, in a case where an ultrasound probe 1 is in contact with the body surface of the subject perpendicularly, for example, a blood vessel 48 running parallel along the body surface is displayed so as to run in a horizontal direction in a three-dimensional space on a monitor on which a three-dimensional ultrasound image is displayed. On the other hand, as illustrated in FIG. 14B, in a case where the ultrasound probe 1 is in contact with the body surface by being tilted from a vertical direction, the blood vessel 48 is displayed so as to run in an inclined manner from the horizontal direction in the three-dimensional space.

Here, a case is considered in which a user himself/herself assumes that the ultrasound probe 1 is in contact with the body surface perpendicularly, but actually, the ultrasound probe 1 is in contact with the body surface in an inclined manner as illustrated in FIG. 14B described above. In this case, as described above, the blood vessel 48 is displayed so as to run in an inclined manner in the three-dimensional space. However, the user believes that the ultrasound probe 1 is in contact with the body surface perpendicularly, and therefore, the user may misunderstand that the blood vessel 48 is actually running in an inclined manner, as illustrated in FIG. 15.

In this manner, in a case of scanning the examination location of the subject using the ultrasound probe, in a case where an angle of the ultrasound probe assumed by the user and an actual angle of the ultrasound probe are different, there is a possibility that the user may erroneously interpret not only the blood vessel but also the three-dimensional ultrasound image. Especially in a case of puncture, in a case where the blood vessel running is misread, the risk such as a possibility of puncture failure, and a possibility of puncturing an inappropriate blood vessel is high.

On the contrary, WO2017/094397A discloses that a surface position of a cartilage is detected from echo data generated from echo signals of ultrasound signals, a plane is calculated by surface fitting three-dimensional information of the surface position of the cartilage, and the normal vector of this plane is detected.

JP2013-169389A discloses that in a state where a reference object is sandwiched between an examination target and the ultrasound probe, by freehand scanning, a plurality of ultrasound tomographic images in which both the reference object and the examination target are shown are acquired, a position and a posture of each ultrasound tomographic image with respect to the reference object are acquired, and an ultrasound three-dimensional image of the examination target is constructed on the basis of each ultrasound tomographic image, and the position and the posture of each ultrasound tomographic image with respect to the reference object.

JP2015-080570A discloses that a border between a subcutaneous fat layer and a muscle layer in the ultrasound tomographic image of the subject is detected, and a thickness of these in-vivo tissue layers is measured.

However, JP2019-208592A, JP2019-509856A, JP2013-146454A, WO2017/094397A, JP2013-169389A, and JP2015-080570A do not disclose that a three-dimensional ultrasound image is corrected according to the inclination of the ultrasound probe in a case where the ultrasound probe is in contact with the body surface in an inclined manner. In addition, in JP2013-169389A, it is essential to use the reference object having a predetermined shape in order to calculate the position and the posture of the ultrasound tomographic image, and it is necessary to acquire a plurality of ultrasound tomographic images in a state where the reference object is sandwiched between the examination target and the ultrasound probe.

An object of the present invention is to provide an ultrasound diagnostic apparatus and a control method of the ultrasound diagnostic apparatus which can generate a three-dimensional ultrasound image for which the inclination of the ultrasound probe is corrected even in a case where the ultrasound probe is in contact with the body surface in an inclined manner.

In order to achieve the object, an aspect of the present invention provides an ultrasound diagnostic apparatus including an ultrasound probe having a transducer array; a two-dimensional image generation unit that generates a plurality of two-dimensional ultrasound images from reception signals obtained by sequentially performing transmission and reception of ultrasound beams while shifting an angle or a position of a scanning plane, using the transducer array in a state where the ultrasound probe is in contact with an examination location of a subject; a tissue layer detection unit that analyzes each of the plurality of two-dimensional ultrasound images to detect a tissue layer in a range from a body surface of the examination location to a predetermined depth; a normal vector calculation unit that calculates a normal vector perpendicular to a tissue plane in a three-dimensional space on the basis of the tissue layer; a three-dimensional image generation unit that generates a three-dimensional ultrasound image corrected such that the tissue plane is horizontal on the basis of the plurality of two-dimensional ultrasound images and the normal vector; a monitor; and a display control unit that displays the three-dimensional ultrasound image on the monitor.

Here, it is preferable that the tissue layer detection unit changes the range from the body surface of the examination location to the predetermined depth in a case of detecting the tissue layer according to the examination location.

In addition, it is preferable that the tissue layer detection unit changes the range from the body surface of the examination location to the predetermined depth in a case of detecting the tissue layer according to a body type of the subject.

It is preferable that the ultrasound diagnostic apparatus further includes a posture image generation unit that generates a posture image indicating a posture of the ultrasound probe with respect to the examination location, on the basis of the normal vector, in which the display control unit displays the three-dimensional ultrasound image and the posture image on the monitor.

In addition, it is preferable that the posture image is an icon image that indicates the posture of the ultrasound probe, or a line image that indicates an inclination of the ultrasound probe and extends along a central axis extending along a longitudinal direction of the ultrasound probe.

In addition, it is preferable that the ultrasound diagnostic apparatus further includes a pressure sensor that is attached to the ultrasound probe, and detects a pressure applied to the examination location via the ultrasound probe; and a notification unit that, in a case where the pressure detected by the pressure sensor is equal to or greater than a predetermined pressure, notifies a user of a possibility that the tissue plane in the three-dimensional ultrasound image is not corrected to be horizontal.

In addition, it is preferable that the ultrasound diagnostic apparatus further includes a notification unit that in a case where the three-dimensional ultrasound image corrected such that the tissue plane is horizontal is generated, notifies a user that the tissue plane in the three-dimensional ultrasound image is corrected to be horizontal.

In addition, it is preferable that the ultrasound diagnostic apparatus according further includes a notification unit that, in a case where the tissue layer is not detected, notifies a user that the tissue layer is not detected.

In addition, it is preferable that the ultrasound diagnostic apparatus further includes an image switching unit that switches between whether the three-dimensional image generation unit generates the three-dimensional ultrasound image corrected such that the tissue plane is horizontal on the basis of the normal vector and whether the three-dimensional image generation unit generates the three-dimensional ultrasound image regardless of the normal vector, in response to an instruction from a user.

In addition, it is preferable that, after the three-dimensional ultrasound image is displayed on the monitor, in a case where a display direction of the three-dimensional ultrasound image is changed in response to an instruction from a user, the three-dimensional image generation unit stores a normal vector corresponding to the three-dimensional ultrasound image of which the display direction is changed, and rotates the display direction of the three-dimensional ultrasound image such that the normal vector corresponding to the three-dimensional ultrasound image is aligned with the normal vector corresponding to the three-dimensional ultrasound image of which the display direction is changed.

Further, another aspect of the present invention provides a control method of an ultrasound diagnostic apparatus, the control method including a step of generating a plurality of two-dimensional ultrasound images from reception signals obtained by sequentially performing transmission and reception of ultrasound beams while shifting an angle or a position of a scanning plane, using a transducer array of an ultrasound probe in a state where the ultrasound probe is in contact with an examination location of a subject, via a two-dimensional image generation unit; a step of analyzing each of the plurality of two-dimensional ultrasound images to detect a tissue layer in a range from a body surface of the examination location to a predetermined depth, via a tissue layer detection unit; a step of calculating a normal vector perpendicular to a tissue plane in a three-dimensional space on the basis of the tissue layer, via a normal vector calculation unit; a step of generating a three-dimensional ultrasound image corrected such that the tissue plane is horizontal on the basis of the plurality of two-dimensional ultrasound images and the normal vector, via a three-dimensional image generation unit; and a step of displaying the three-dimensional ultrasound image on a monitor via a display control unit.

In the present invention, the tissue layer of each of the plurality of two-dimensional ultrasound images is detected, the normal vector perpendicular to the tissue plane in the three-dimensional space is calculated, and the three-dimensional ultrasound image corrected such that the tissue plane is horizontal is generated on the basis of the plurality of two-dimensional ultrasound images and the normal vector. As a result, according to the present invention, even in a case where the ultrasound probe is in contact with the examination location of the subject in an inclined manner, the three-dimensional ultrasound image in which the inclination of the tissue plane corresponding to the inclination of the ultrasound probe, that is, the inclination of the three-dimensional ultrasound image is corrected can be generated.

DESCRIPTION OF THE PREFERRED EMBODIMENTS

Hereinafter, an ultrasound diagnostic apparatus and a control method of the ultrasound diagnostic apparatus according to an embodiment of the present invention will be described in detail on the basis of preferred embodiments illustrated in the accompanying drawings.

Figure 1:
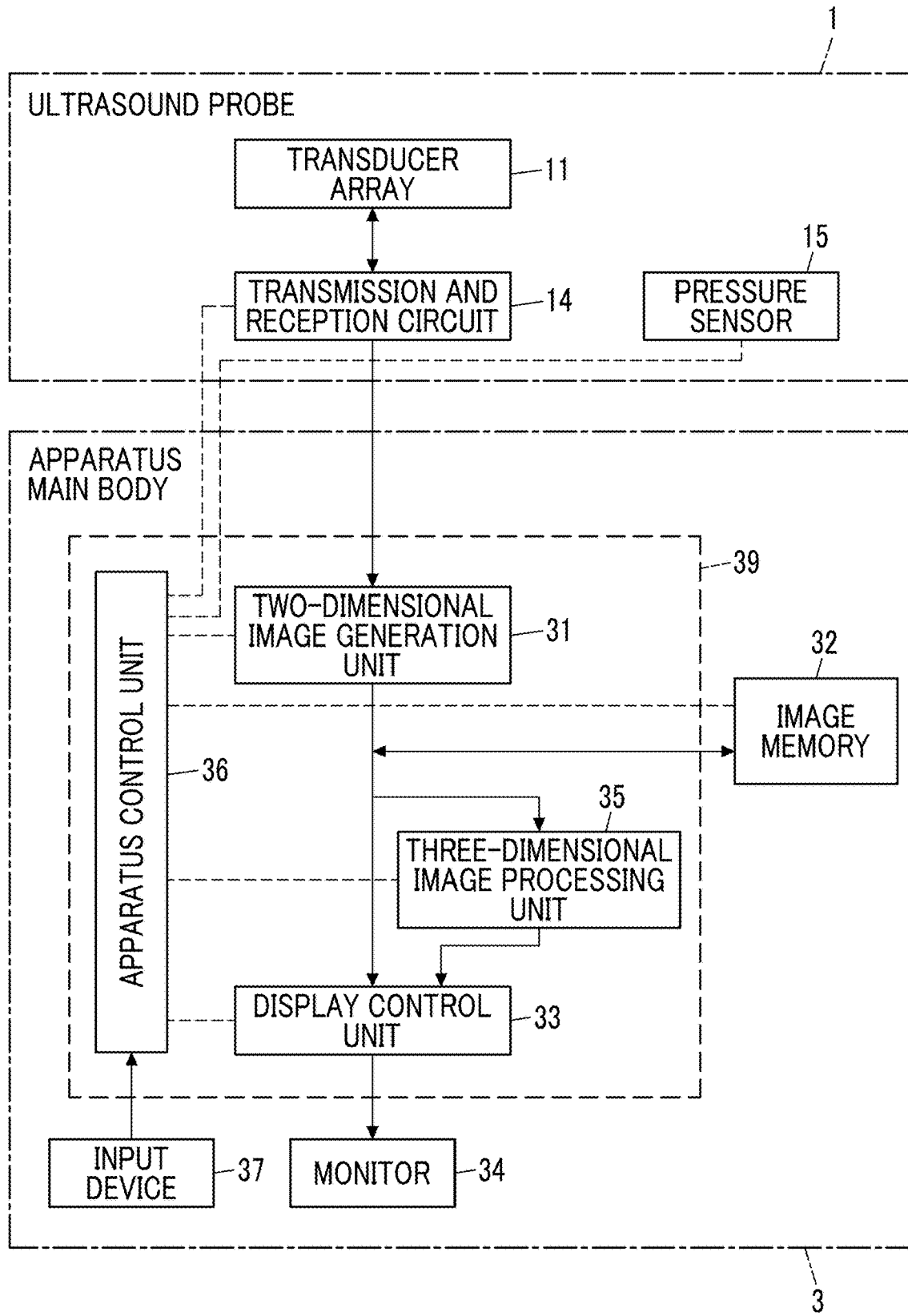
FIG. 1 is a block diagram of an embodiment illustrating a configuration of an ultrasound diagnostic apparatus of the present invention.

FIG. 1 is a block diagram of an embodiment illustrating a configuration of an ultrasound diagnostic apparatus according to the embodiment of the present invention. The ultrasound diagnostic apparatus illustrated in FIG. 1 is a stationary ultrasound diagnostic apparatus, and includes an ultrasound probe 1, and an apparatus main body 3 connected to the ultrasound probe 1.

The ultrasound probe 1 scans an examination location of a subject using an ultrasound beam, and outputs a sound ray signal corresponding to a two-dimensional ultrasound image of the examination location. As illustrated in FIG. 1, the ultrasound probe 1 includes a transducer array 11, a transmission and reception circuit 14, and a pressure sensor 15. The transducer array 11 and the transmission and reception circuit 14 are bidirectionally connected to each other. In addition, an apparatus control unit 36 of the apparatus main body 3 which will be described later is connected to each of the transmission and reception circuit 14 and the pressure sensor 15.

The transducer array 11 has a plurality of ultrasonic transducers arranged in a one-dimensional or two-dimensional manner. According to a drive signal supplied from the transmission and reception circuit 14, each of the transducers transmits an ultrasonic wave and receives a reflected wave from the subject to output an analog reception signal. For example, each transducer is formed by using an element in which electrodes are formed at both ends of a piezoelectric body consisting of piezoelectric ceramic represented by lead zirconate titanate (PZT), a polymer piezoelectric element represented by poly vinylidene di fluoride (PVDF), piezoelectric single crystal represented by lead magnesium niobate-lead titanate (PMN-PT), or the like.

Figure 2:
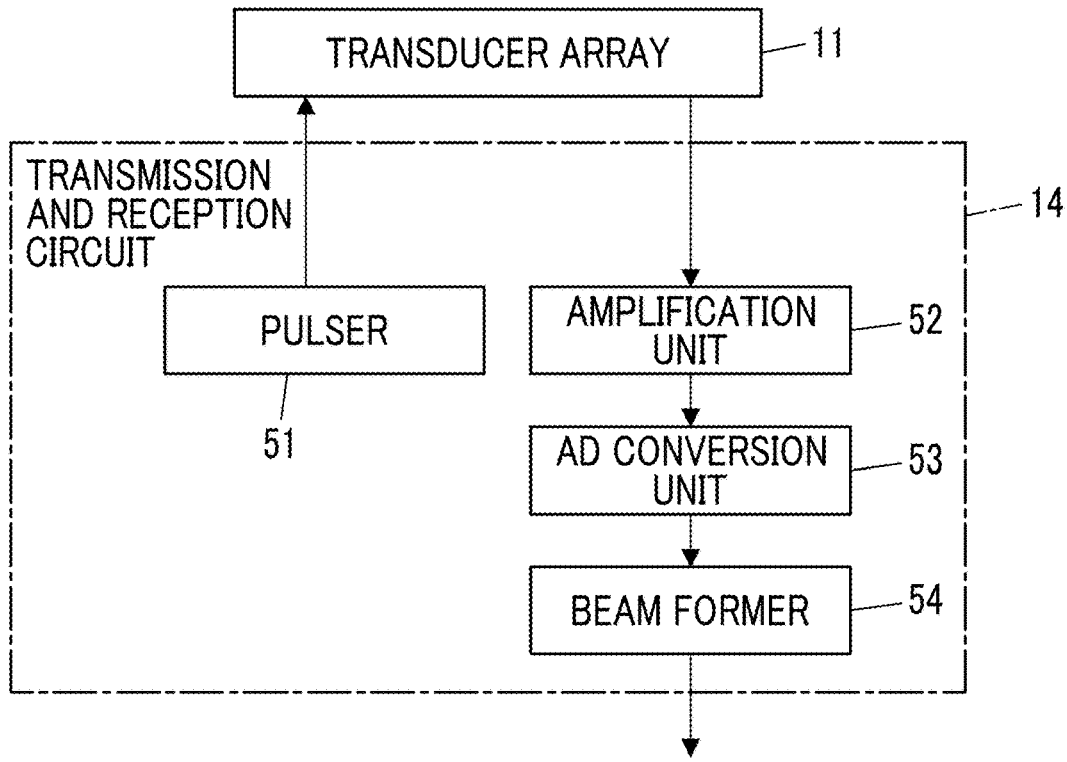
FIG. 2 is a block diagram of an embodiment illustrating a configuration of a transmission and reception circuit.

The transmission and reception circuit 14 causes the transducer array 11 to transmit the ultrasonic wave, and performs reception focusing processing on the reception signal output from the transducer array 11 that has received the ultrasound echo to generate a sound ray signal, under the control of the apparatus control unit 36. As illustrated in FIG. 2, the transmission and reception circuit 14 has a pulser 51 connected to the transducer array 11, and an amplification unit 52, an analog digital (AD) conversion unit 53, and a beam former 54 that are sequentially connected in series from the transducer array 11.

The pulser 51 includes, for example, a plurality of pulse generators, and the pulser 51 adjusts the amount of delay of each drive signal so that ultrasonic waves transmitted from the plurality of transducers of the transducer array 11 form an ultrasound beam on the basis of a transmission delay pattern selected by the apparatus control unit 36, and supplies the obtained signals to the plurality of transducers. Thus, in a case where a pulsed or continuous-wave voltage is applied to the electrodes of the transducers of the transducer array 11, the piezoelectric body expands and contracts to generate pulsed or continuous-wave ultrasonic waves from each transducer. From the combined wave of these ultrasonic waves, an ultrasound beam is formed.

The transmitted ultrasound beam is reflected by a target, for example, a site of the subject, and propagates toward the transducer array 11 of the ultrasound probe 1. Each transducer constituting the transducer array 11 expands and contracts by receiving the ultrasound echo propagating toward the transducer array 11 in this manner, to generate the reception signal that is an electric signal, and outputs the reception signal to the amplification unit 52.

The amplification unit 52 amplifies the signals input from each transducer constituting the transducer array 11, and transmits the amplified signals to the AD conversion unit 53. The AD conversion unit 53 converts the analog signal transmitted from the amplification unit 52 into digital reception data, and outputs the reception data to the beam former 54.

The beam former 54 performs so-called reception focusing processing in which addition is performed by giving delays to respective pieces of the reception data converted by the AD conversion unit 53 according to a sound speed distribution or a sound speed set on the basis of a reception delay pattern selected by the apparatus control unit 36. Through the reception focusing processing, a sound ray signal in which each piece of the reception data converted by the AD conversion unit 53 is phased and added and the focus of the ultrasound echo is narrowed is generated.

The pressure sensor 15 is attached to the ultrasound probe 1. The pressure sensor 15 detects a pressure applied to the examination location of the subject by the ultrasound probe 1, under the control of the apparatus control unit 36.

Next, the apparatus main body 3 generates the two-dimensional ultrasound images of the examination location of the subject on the basis of the sound ray signals generated by the ultrasound probe 1, generates the three-dimensional ultrasound image using the plurality of two-dimensional ultrasound images, and displays the two-dimensional ultrasound image and the three-dimensional ultrasound image of the examination location of the subject. As illustrated in FIG. 1, the apparatus main body 3 includes a two-dimensional image generation unit 31, an image memory 32, a three-dimensional image processing unit 35, a display control unit 33, a monitor (display unit) 34, an input device 37, and the apparatus control unit 36.

The two-dimensional image generation unit 31 is connected to the transmission and reception circuit 14, and the display control unit 33 and the monitor 34 are sequentially connected in series to the two-dimensional image generation unit 31. In addition, the image memory 32 is connected to the two-dimensional image generation unit 31, and each of the display control unit 33 and the three-dimensional image processing unit 35 is connected to the image memory 32. Furthermore, the display control unit 33 is connected to the three-dimensional image processing unit 35. The apparatus control unit 36 is connected to the two-dimensional image generation unit 31, the display control unit 33, the image memory 32, and the three-dimensional image processing unit 35, and the input device 37 is connected to the apparatus control unit 36.

The two-dimensional image generation unit 31 generates the two-dimensional ultrasound image (two-dimensional ultrasound image signal) of the examination location of the subject, from the reception signal obtained by performing transmission and reception of the ultrasound beams with respect to the examination location of the subject using the transducer array 11 of the ultrasound probe 1, in other words, from the sound ray signal generated from the reception signal by the transmission and reception circuit 14 in a state where the ultrasound probe 1 is in contact with the examination location of the subject, under the control of the apparatus control unit 36.

Figure 7A:
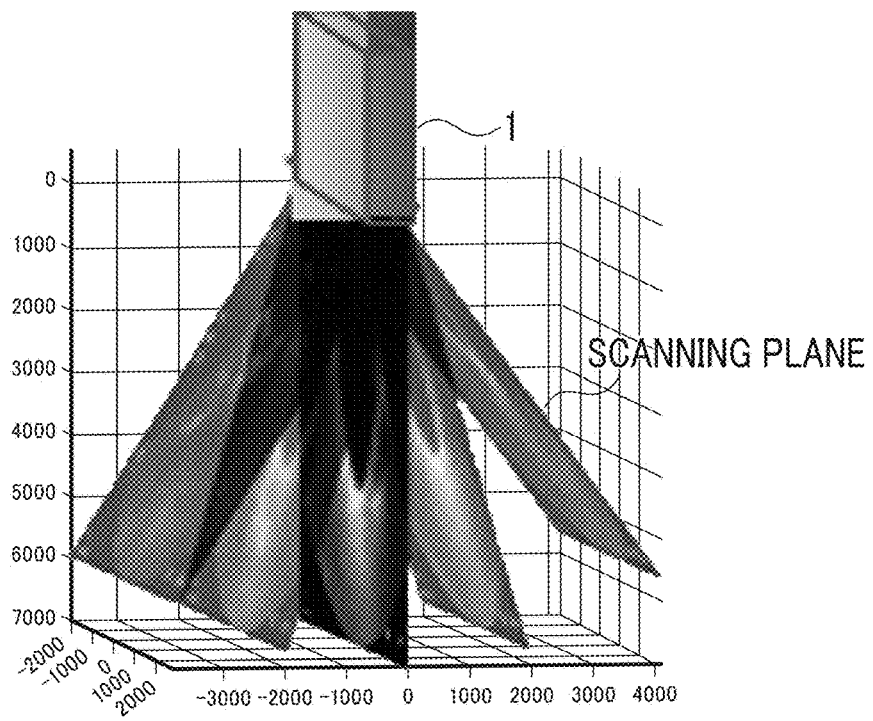
FIG. 7A is a conceptual diagram of an embodiment illustrating a state in which an angle of a scanning plane is shifted.
Figure 7B:
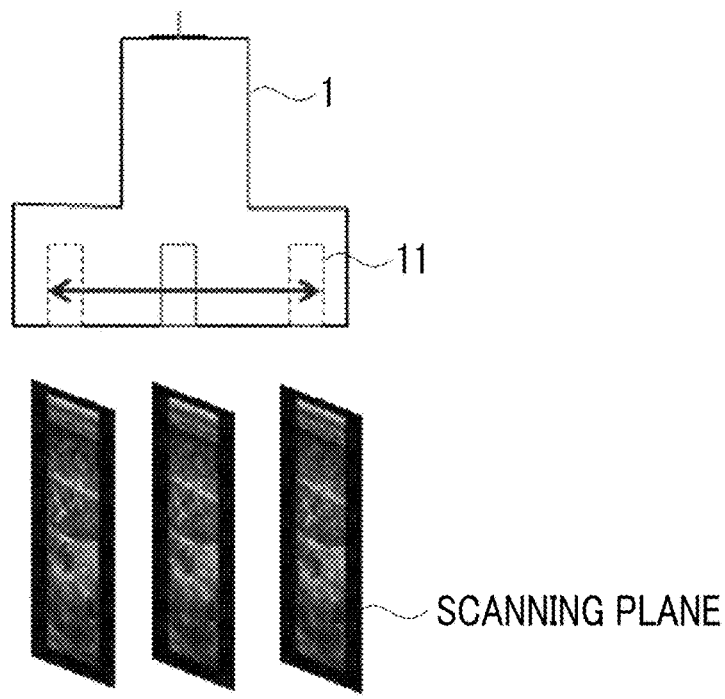
FIG. 7B is a conceptual diagram of an embodiment illustrating a state in which a position of a scanning plane is shifted.

In addition, the two-dimensional image generation unit 31 generates the plurality of two-dimensional ultrasound images with different angles or positions of the scanning plane from the reception signal obtained by sequentially performing the transmission and reception of the ultrasound beams while shifting the angle or position of the scanning plane in an elevation direction using the transducer array 11 as illustrated in FIGS. 7A and 7B, in a state where the ultrasound probe 1 is in contact with the examination location of the subject. The plurality of two-dimensional ultrasound images are set as one set, and one three-dimensional ultrasound image (three-dimensional ultrasound image signal) is generated using one set of the plurality of two-dimensional ultrasound images.

Figure 3:
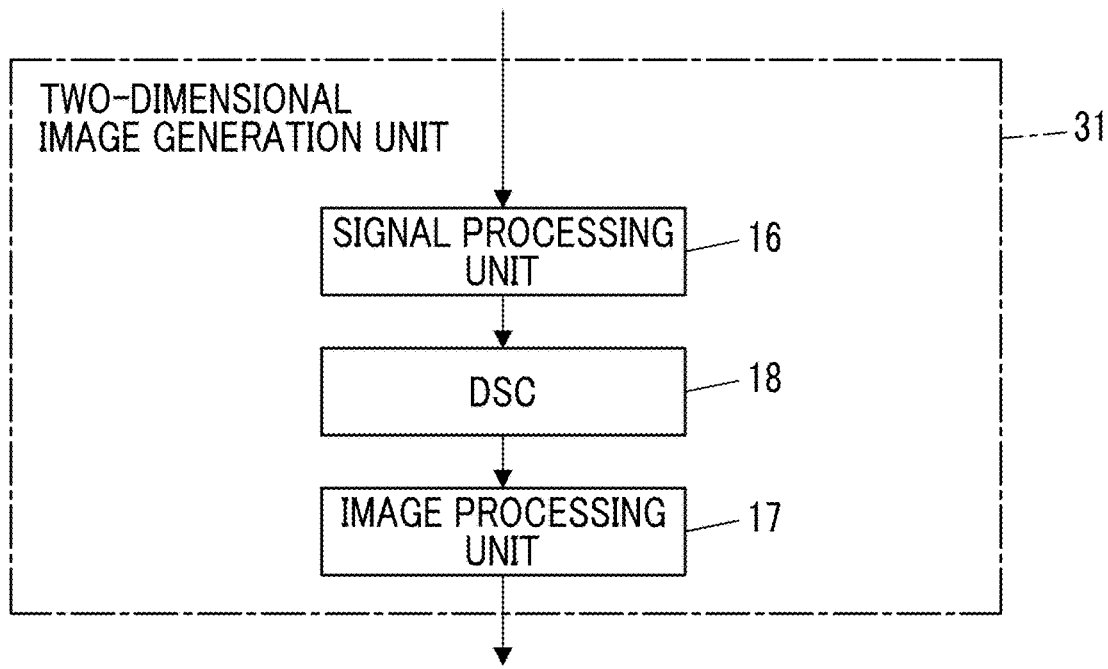
FIG. 3 is a block diagram of an embodiment illustrating a configuration of a two-dimensional image generation unit.

As illustrated in FIG. 3, the two-dimensional image generation unit 31 has a configuration in which a signal processing unit 16, a digital scan converter (DSC) 18, and an image processing unit 17 are sequentially connected in series.

The signal processing unit 16 generates image information data corresponding to the two-dimensional ultrasound image on the basis of the sound ray signal generated by the transmission and reception circuit 14. More specifically, the signal processing unit 16 generates the image information data representing tomographic image information regarding tissues inside the subject, by performing envelope detection processing after signal processing, for example, correcting the attenuation of the sound ray signal generated by the beam former 54 of the transmission and reception circuit 14, which is caused by the propagation distance according to the depth of the reflection position of the ultrasonic wave.

The DSC 18 raster-converts the image information data generated by the signal processing unit 16 into an image signal according to a normal television signal scanning method.

The image processing unit 17 performs various kinds of image processing such as brightness correction, gradation correction, sharpness correction, image size correction, refresh rate correction, scanning frequency correction, and color correction according to a display format of the monitor 34, on the image signal input from the DSC 18 to generate the two-dimensional ultrasound image, and then outputs the two-dimensional ultrasound image on which the image processing has been performed, to the image memory 32 and the display control unit 33.

The image memory 32 is a memory that holds two-dimensional ultrasound images of the series of a plurality of frames, which are generated for each examination by the two-dimensional image generation unit 31, under the control of the apparatus control unit 36. For example, in a case where the three-dimensional ultrasound image is generated, as described above, the plurality of two-dimensional ultrasound images with different angles or positions of the scanning plane are generated by the two-dimensional image generation unit 31, and the plurality of two-dimensional ultrasound images are held in the image memory 32.

Here, as the image memory 32, recording media such as a flash memory, a hard disk drive (HDD), a solid state drive (SSD), a flexible disc (FD), a magneto-optical disc (MO disc), a magnetic tape (MT), a random access memory (RAM), a compact disc (CD), a digital versatile disc (DVD), a secure digital card (SD card), and a universal serial bus memory (USB memory), an external server, or the like can be used.

Figure 4:
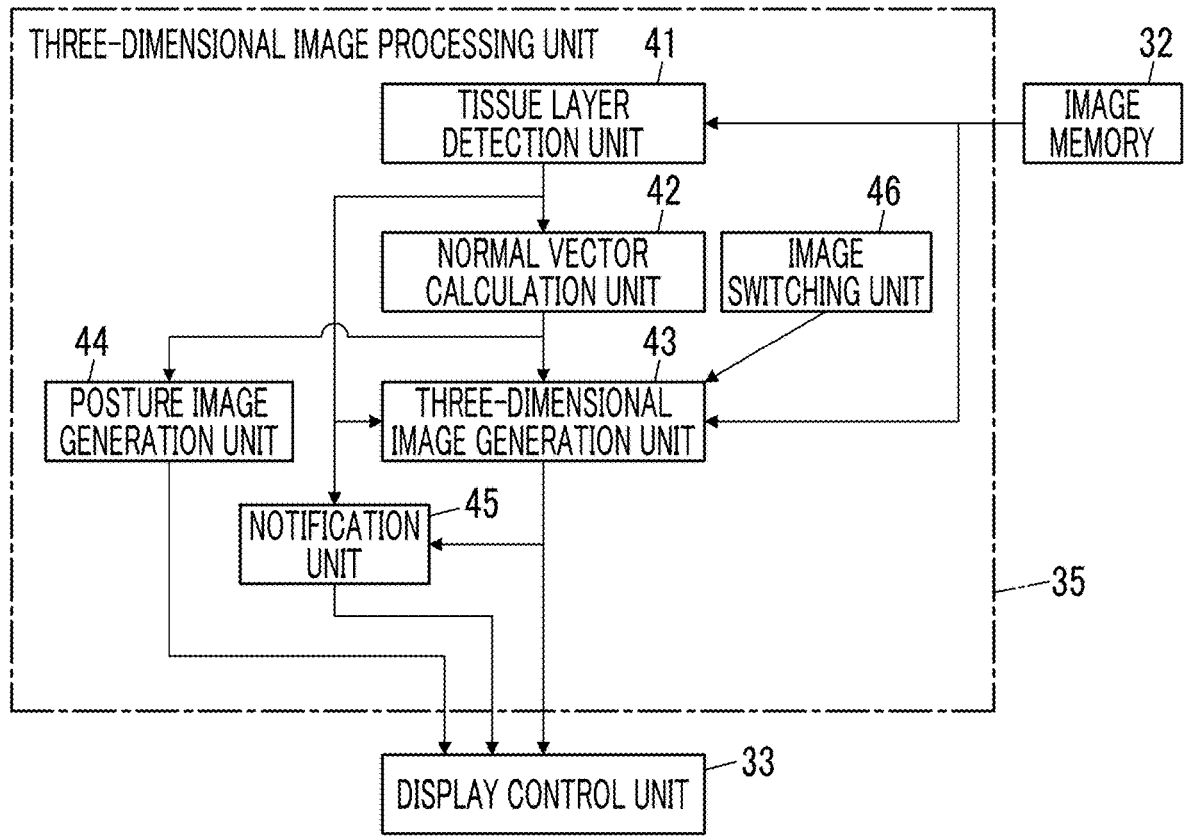
FIG. 4 is a block diagram of an embodiment illustrating a configuration of a three-dimensional image processing unit.

The three-dimensional image processing unit 35 performs various kinds of processing for generating the three-dimensional ultrasound image of the examination location of the subject using the plurality of two-dimensional ultrasound images held in the image memory 32, under the control of the apparatus control unit 36. As illustrated in FIG. 4, the three-dimensional image processing unit 35 includes a tissue layer detection unit 41, a normal vector calculation unit 42, a three-dimensional image generation unit 43, a posture image generation unit 44, a notification unit 45, and an image switching unit 46.

The tissue layer detection unit 41 is connected to the image memory 32, and the normal vector calculation unit 42, the three-dimensional image generation unit 43, and the display control unit 33 are sequentially connected to the tissue layer detection unit 41. Further, the three-dimensional image generation unit 43 is connected to each of the image memory 32, the tissue layer detection unit 41, and the image switching unit 46. The posture image generation unit 44 is connected to the normal vector calculation unit 42, and the display control unit 33 is connected to the posture image generation unit 44. The notification unit 45 is connected to each of the tissue layer detection unit 41 and the three-dimensional image generation unit 43, and the display control unit 33 is connected to the notification unit 45.

The tissue layer detection unit 41 analyzes each of the plurality of two-dimensional ultrasound images stored in the image memory 32 to detect a two-dimensional tissue layer in a range from the body surface of the examination location of the subject to a predetermined depth in each two-dimensional ultrasound image.

Figure 8:
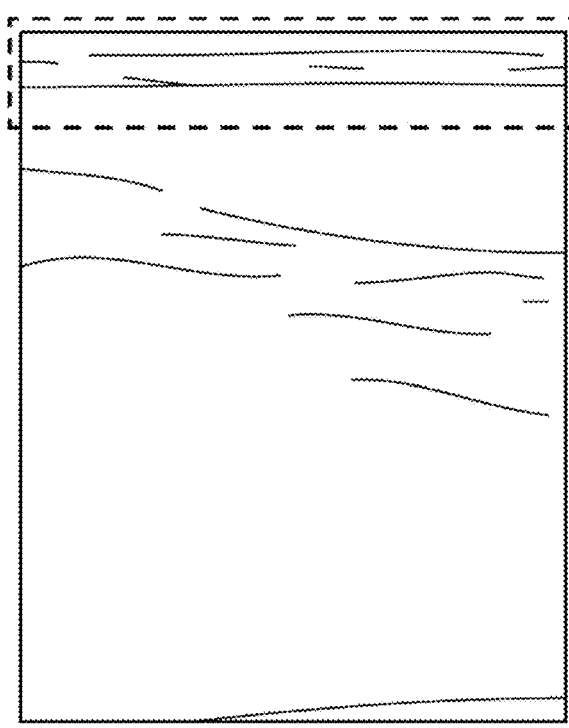
FIG. 8 is a conceptual diagram of an embodiment illustrating a two-dimensional ultrasound image of an examination location of a subject.

In a case where the two-dimensional ultrasound image is generated in a state where the ultrasound probe 1 is in contact with the examination location of the subject, a tissue layer including a fascia, a fat layer, and the like in a superficial region from the body surface of the subject is depicted in the two-dimensional ultrasound image as illustrated in FIG. 8. In FIG. 8, the upper side is the body surface side of the subject. The tissue layer detection unit 41 analyzes each of the plurality of two-dimensional ultrasound images used for generating the three-dimensional ultrasound image to detect the tissue layer in each two-dimensional ultrasound image.

The method of detecting the tissue layer is not particularly limited, but, for example, the tissue layer may be detected by using a machine learning model trained by using a machine learning technique such as deep learning, or the tissue layer may be detected by using various detection techniques known in the related art including template matching, Adaptive boosting (Adaboost), support vector machines (SVM), scale-invariant feature transform (SIFT), edge detection, and the like.

As described in FIG. 8 described above, in the superficial region, the tissue layer of the epidermis part near the body surface is generally parallel to the body surface, but the tissue layer is inclined at a portion deeper than the epidermis part. Therefore, a detection range of the tissue layer, that is, a range from the body surface to a predetermined depth is preferably limited to a range, for example, from the epidermis part enclosed by a dashed line in FIG. 8, that is, from the body surface to a portion where the tissue layer is parallel to the body surface.

For example, the detection result of the tissue layer is stored as three-dimensional point cloud data in the three-dimensional space consisting of an x coordinate in an x direction (for example, the horizontal direction in the three-dimensional space) and a y coordinate in a y direction (for example, the vertical direction in the three-dimensional space) of each two-dimensional ultrasound image, and a z coordinate with a direction in which the angle or position of the scanning plane of each two-dimensional ultrasound image is changed as a z direction (a depth direction in the three-dimensional space).

In the ultrasound diagnostic apparatus, the change amount of the angle or position of the scanning plane is set as a parameter in a case of generating the plurality of two-dimensional ultrasound images used for generating the three-dimensional ultrasound image.

The normal vector calculation unit 42 calculates a normal vector perpendicular to a tissue plane in the three-dimensional space on the basis of the tissue layer detected by the tissue layer detection unit 41. For example, the normal vector calculation unit 42 calculates the normal vector perpendicular to the three-dimensional tissue plane in the three-dimensional space on the monitor 34 on which the three-dimensional ultrasound image is displayed, on the basis of the three-dimensional point cloud data of the tissue layer of the plurality of two-dimensional ultrasound images.

Figure 9A:
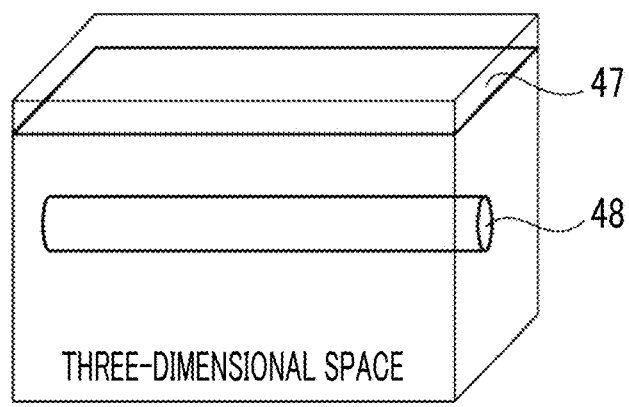
FIG. 9A is a conceptual diagram of an embodiment illustrating a tissue layer and a blood vessel in a three-dimensional space.
Figure 9B:
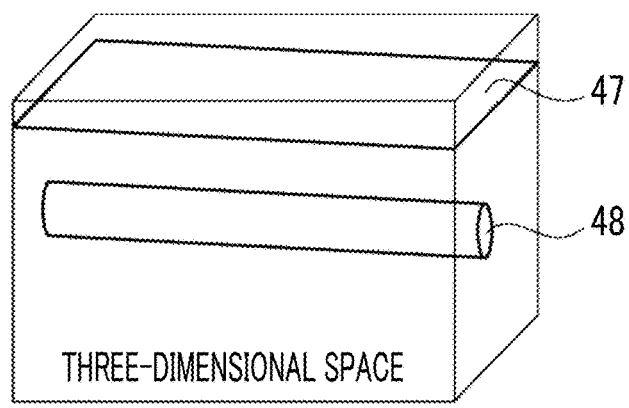
FIG. 9B is a conceptual diagram of another embodiment illustrating a tissue layer and a blood vessel in a three-dimensional space.

In a case where the detection result of the tissue layer in each two-dimensional ultrasound image, for example, the three-dimensional point cloud data is plotted in the three-dimensional space and displayed on the monitor 34, the detection result is as illustrated in FIG. 9A or FIG. 9B. In FIGS. 9A and 9B, in addition to a tissue layer 47, a blood vessel 48 running parallel along the body surface is illustrated. As described above, since the tissue layer 47 at the epidermis part near the body surface is parallel to the body surface, in a case where the ultrasound probe 1 is in contact with the body surface perpendicularly, the plane of the tissue layer 47 is horizontal in the three-dimensional space as illustrated in FIG. 9A. On the other hand, in a case where the ultrasound probe 1 is in contact with the body surface in an inclined manner, the plane of the tissue layer 47 is inclined according to the inclination of the ultrasound probe 1 as illustrated in FIG. 9B.

Accordingly, the normal vector calculation unit 42 calculates an inclination angle of the tissue plane in the three-dimensional space on the basis of the tissue layer of the plurality of two-dimensional ultrasound images, for example, on the basis of the three-dimensional point cloud data. Actually, since the tissue plane calculated from the three-dimensional point cloud data has unevenness, the normal vector calculation unit 42 calculates the tissue plane by performing plane fitting for approximating the point cloud data to a plane by a known technique such as the least squares method, and then calculates the normal vector perpendicular to the tissue plane.

The method of calculating the tissue plane and the normal vector is not limited to the example described above, and various methods known in the related art can be used.

The three-dimensional image generation unit 43 generates the three-dimensional ultrasound image on the basis of the plurality of two-dimensional ultrasound images stored in the image memory 32 and the normal vector calculated by the normal vector calculation unit 42.

The method of generating the three-dimensional ultrasound image is not particularly limited, and various methods of generating a three-dimensional ultrasound image from two or more two-dimensional ultrasound images known in the related art can be used.

In a case where the normal vector is aligned in the vertical direction, that is, in a case where the tissue plane is horizontal, the three-dimensional image generation unit 43 generates the three-dimensional ultrasound image on the basis of the plurality of two-dimensional ultrasound images without correcting the inclination of the tissue plane on the basis of the normal vector.

On the other hand, in a case where the normal vector is not aligned in the vertical direction, that is, in a case where the tissue plane is not horizontal, the three-dimensional image generation unit 43 generates the three-dimensional ultrasound image corrected such that the normal vector is aligned in the vertical direction, that is, such that the tissue plane is horizontal, on the basis of the plurality of two-dimensional ultrasound images and the normal vector. In other words, the three-dimensional image generation unit 43 corrects the inclination of the three-dimensional ultrasound image corresponding to the inclination of the ultrasound probe 1 by correcting the inclination of the tissue plane, and generates a three-dimensional ultrasound image equivalent to the three-dimensional ultrasound image generated in a state where the ultrasound probe 1 is in contact with the body surface perpendicularly.

Figure 10:
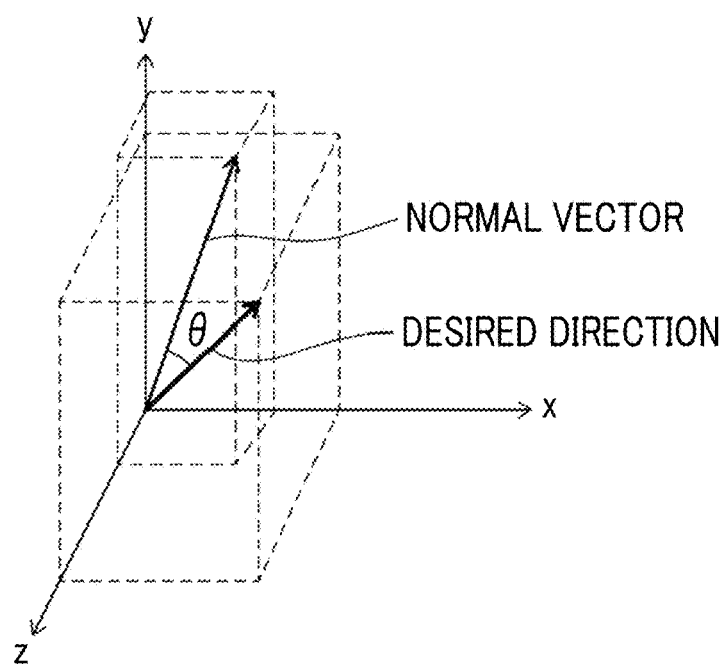
FIG. 10 is a conceptual diagram of an embodiment illustrating an angle θ formed by a normal vector and a desired direction in a three-dimensional space.

As illustrated in FIG. 10, it is possible to obtain the three-dimensional ultrasound image corrected such that normal vector is aligned in the desired direction by rotating the three-dimensional ultrasound image by an angle θ formed by the normal vector and the desired direction in which the normal vector is desired to be aligned about the center of rotation (origin), in the three-dimensional space represented by the x axis, the y axis, and the z axis. Accordingly, the three-dimensional image generation unit 43 can generate the three-dimensional ultrasound image corrected such that the normal vector is aligned in the vertical direction, that is, such that the tissue plane is horizontal, by rotating the three-dimensional ultrasound image by the angle θ formed by the normal vector and the vertical direction.

The method of rotating the three-dimensional ultrasound image is not particularly limited, but the three-dimensional ultrasound image can be rotated, for example, by selecting and synthesizing transformation formulas for two axes from among three transformation formulas for rotating the three-dimensional ultrasound image about each of the x axis, the y axis, and the z axis using a rotation matrix.

Further, typical methods of rotating the three-dimensional ultrasound image include methods using quaternions, the Euler angles, and the like.

Figure 11:
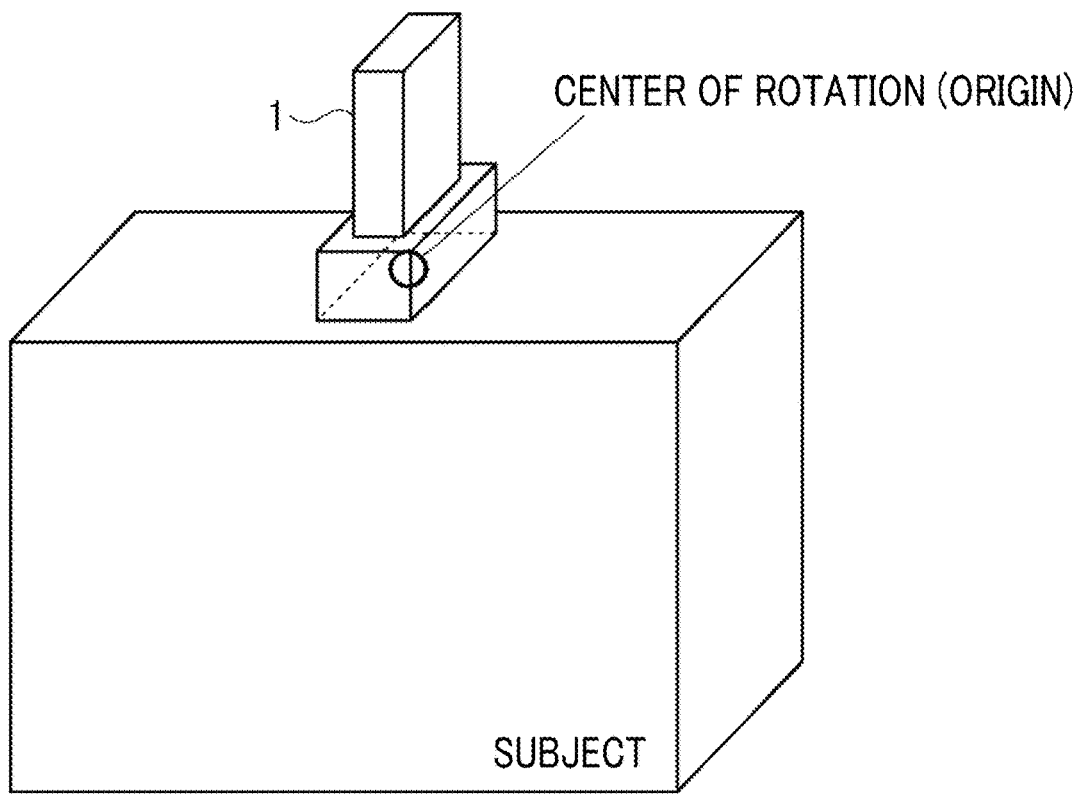
FIG. 11 is a conceptual diagram of an embodiment illustrating a center of rotation in a case of rotating a three-dimensional ultrasound image.

In addition, in a case where the three-dimensional ultrasound image is rotated, it is necessary to define the center of rotation (origin), and, for example, it is preferable that the center of rotation is the position of the central ultrasonic transducer among the plurality of ultrasonic transducers of the transducer array 11, in the contact surface between the ultrasound probe 1 and the body surface of the examination location of the subject, as illustrated in FIG. 11. As a result, it is possible to minimize the movement of the position of the three-dimensional ultrasound image at the time of rotating the three-dimensional ultrasound image.

The posture image generation unit 44 generates a posture image indicating the posture of the ultrasound probe 1 with respect to the examination location of the subject on the basis of the normal vector.

The posture image is not particularly limited as long as the posture image is an image showing the posture of the ultrasound probe 1, in other words, the inclination of the ultrasound probe 1, but may be an icon image indicating the posture of the ultrasound probe 1, for example. The icon image may be an image indicating the shape of the ultrasound probe 1, or may be an image of any shape such as a quadrangular prism. In addition, the posture image may be a line image that indicates the inclination of the ultrasound probe 1 in the three-dimensional space represented by the x axis, the y axis, and the z axis, and extends along a central axis extending along a longitudinal direction of the ultrasound probe 1.

The notification unit 45 notifies the user of various messages.

The method of notifying the message is not particularly limited. However, under the control of the notification unit, a message may be displayed on the monitor 34 by the display control unit 33, a voice for reading a message may be output from a speaker (not illustrated), or both the display of the message and the voice output may be performed at the same time.

Whether the three-dimensional image generation unit 43 generates a three-dimensional ultrasound image corrected such that the tissue plane is horizontal on the basis of the normal vector (correction on state) and whether the three-dimensional image generation unit 43 generates a three-dimensional ultrasound image regardless of the normal vector, that is, a three-dimensional ultrasound image for which the inclination of the tissue plane is not corrected (correction off state) are switched by the image switching unit 46 in response to an instruction from the user.

The display control unit 33 displays various kinds of information on the monitor 34 under the control of the apparatus control unit 36. For example, the display control unit 33 performs predetermined processing on the two-dimensional ultrasound image generated by the two-dimensional image generation unit 31 or the two-dimensional ultrasound image held in the image memory 32, and displays the processed two-dimensional ultrasound image on the monitor 34. In addition, the display control unit 33 performs predetermined processing on the three-dimensional ultrasound image generated by the three-dimensional image generation unit 43, and displays the processed three-dimensional ultrasound image on the monitor 34.

The monitor 34 displays various kinds of information under the control of the display control unit 33. For example, the monitor 34 displays the two-dimensional ultrasound image generated by the two-dimensional image generation unit 31 or the two-dimensional ultrasound image held in the image memory 32, and the three-dimensional ultrasound image generated by the three-dimensional image generation unit 43. Examples of the monitor 34 include a display device such as a liquid crystal display (LCD), and an organic electroluminescence (EL) display.

The monitor 34 may perform three-dimensional display on a normal two-dimensional display, or may be a three-dimensional display that allows the user to wear stereoscopic glasses and view stereoscopic three-dimensional ultrasound images.

The input device 37 receives various instructions input from the user. Although not particularly limited, the input device 37 includes various buttons, and a touch panel or the like through which various instructions are input by the user performing a touch operation.

The apparatus control unit 36 controls the ultrasound probe 1 and each unit of the apparatus main body 3 on the basis of a program stored in advance and an instruction or the like from the user input from the input device 37.

The two-dimensional image generation unit 31, the three-dimensional image processing unit 35, the display control unit 33, and the apparatus control unit 36 constitute a processor 39.

Figure 5:
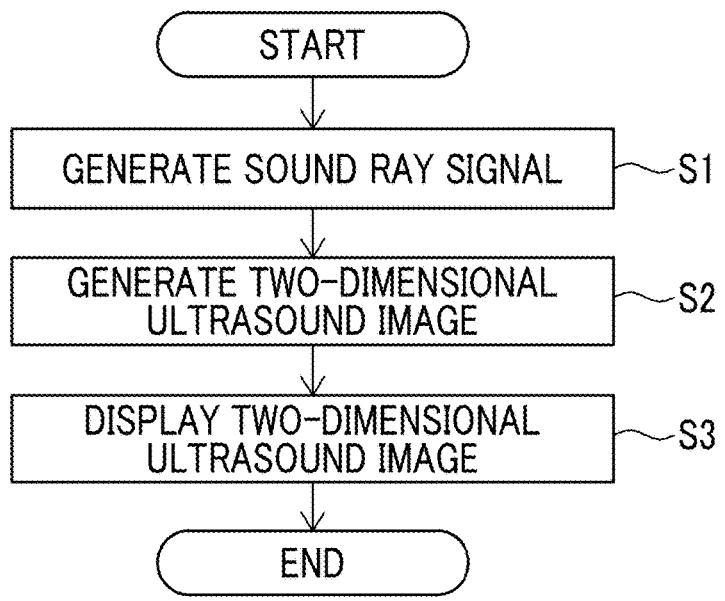
FIG. 5 is a flowchart of an embodiment illustrating an operation of an ultrasound diagnostic apparatus in a case of generating a two-dimensional ultrasound image.

Next, the operation of the ultrasound diagnostic apparatus in a case of generating the two-dimensional ultrasound image will be described with reference to the flowchart of FIG. 5.

First, in a case where the two-dimensional ultrasound image is generated, in a state where the ultrasound probe 1 is in contact with the examination location of the subject, the transmission of the ultrasonic waves is started and the sound ray signal is generated by the transmission and reception circuit 14, under the control of the apparatus control unit 36 (Step S1).

That is, the ultrasound beams are transmitted to the examination location of the subject from a plurality of transducers of the transducer array 11 according to the drive signals from the pulser 51.

Ultrasound echoes from the examination location based on the ultrasound beams transmitted from the pulser 51 are received by each transducer of the transducer array 11, and the reception signal as an analog signal is output from each transducer of the transducer array 11, which has received the ultrasound echo.

The reception signal output from each transducer of the transducer array 11 is amplified by the amplification unit 52, and is subjected to AD conversion by the AD conversion unit 53, and thereby the reception data is acquired.

By performing the reception focusing processing on the reception data by the beam former 54, the sound ray signal is generated.

Next, under the control of the apparatus control unit 36, the two-dimensional ultrasound image of the examination location of the subject is generated by the two-dimensional image generation unit 31 on the basis of the sound ray signal generated by the beam former 54 of the transmission and reception circuit 14 (Step S2).

That is, the sound ray signal generated by the beam former 54 is subjected to various kinds of signal processing by the signal processing unit 16, and the image information data representing tomographic image information regarding tissues inside the subject is generated.

The image information data generated by the signal processing unit 16 is raster-converted by the DSC 18, and is further subjected to various kinds of image processing by the image processing unit 17, and thus the two-dimensional ultrasound image is generated.

The two-dimensional ultrasound image generated by the image processing unit 17 is held in the image memory 32.

Next, under the control of the apparatus control unit 36, predetermined processing is performed on the two-dimensional ultrasound image generated by the image processing unit 17 or the two-dimensional ultrasound image held in the image memory 32 by the display control unit 33, and the processed two-dimensional ultrasound image is displayed on the monitor 34 (Step S3).

Figure 6:
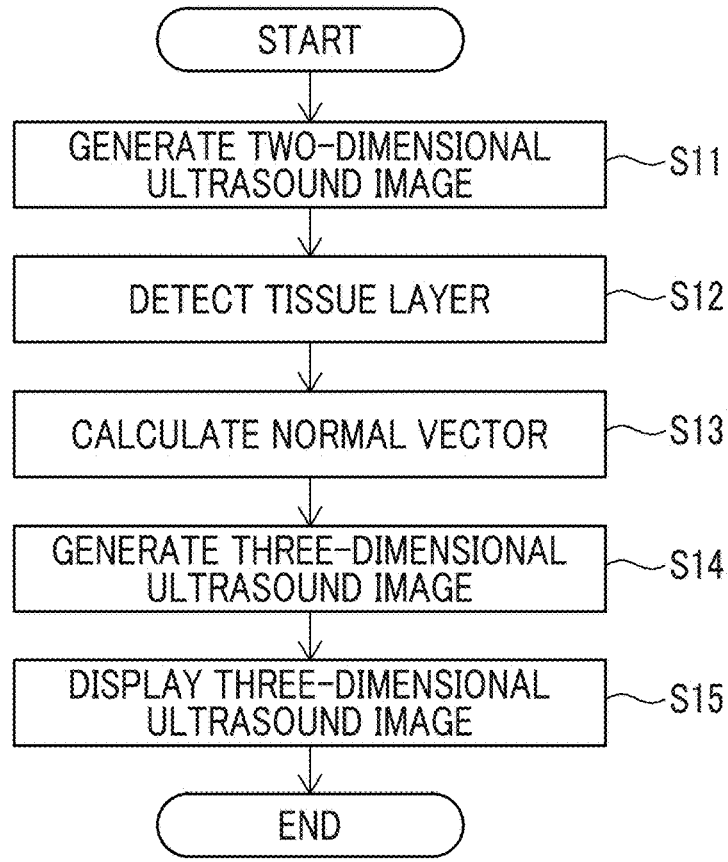
FIG. 6 is a flowchart of an embodiment illustrating an operation of an ultrasound diagnostic apparatus in a case of generating a three-dimensional ultrasound image.

Next, the operation of the ultrasound diagnostic apparatus in a case of generating the three-dimensional ultrasound image will be described with reference to the flowchart illustrated in FIG. 6.

In a case where the three-dimensional ultrasound image is generated, first, under the control of the apparatus control unit 36, the plurality of two-dimensional ultrasound images with different angles or positions of the scanning plane are generated by the two-dimensional image generation unit 31 from the reception signals obtained by sequentially performing the transmission and reception of the ultrasound beams while shifting the angle or position of the scanning plane using the transducer array 11 in a state where the ultrasound probe 1 is in contact with the examination location of the subject (Step S11).

For example, in a case where the angle of the scanning plane is shifted using the one-dimensional transducer array 11, inside the housing of the ultrasound probe 1, the one-dimensional transducer array 11 is mechanically sequentially moved in the elevation direction along an arc centered on a rotation axis by a predetermined angle, and the transmission and reception of the ultrasound beams is sequentially performed while the angle of the scanning plane is shifted in the elevation direction (for example, refer to FIG. 2 of JP2013-146454A). As a result, the plurality of two-dimensional ultrasound images with different angles of the scanning plane are generated.

In a case where the position of the scanning plane is shifted using the one-dimensional transducer array 11, inside the housing of the ultrasound probe 1, the one-dimensional transducer array 11 is mechanically moved in parallel in the elevation direction by a predetermined distance, or the ultrasound probe 1 is manually moved by the user in parallel in the elevation direction, and the transmission and reception of the ultrasound beams is sequentially performed while the position of the scanning plane is sequentially shifted in the elevation direction (for example, refer to FIG. 7B). As a result, the plurality of two-dimensional ultrasound images with different positions of the scanning plane are generated.

In a case where the angle of the scanning plane is shifted using the two-dimensional transducer array 11, data of a transducer group extending in the azimuth direction of the two-dimensional transducer array 11 is delayed in the elevation direction, the scanning plane is sequentially steered by a predetermined angle, and the transmission and reception of the ultrasound beams is sequentially performed while the angle of the scanning plane is sequentially shifted in the elevation direction (for example, refer to FIG. 7A). As a result, the plurality of two-dimensional ultrasound images with different angles of the scanning plane are generated.

In a case where the position of the scanning plane is shifted using the two-dimensional transducer array 11, a transducer group extending in the azimuth direction of the two-dimensional transducer array 11 is sequentially selected in the elevation direction, and the transmission and reception of the ultrasound beams is sequentially performed while the position of the scanning plane is sequentially shifted in the elevation direction. As a result, the plurality of two-dimensional ultrasound images with different positions of the scanning plane are generated.

The method of shifting the angle or position of the scanning plane is not limited to the specific example described above, various methods for automatically or manually shifting the angle or position of the scanning plane in a state where the ultrasound probe 1 is fixed by being in contact with the examination location of the subject can be used.

Next, the two-dimensional ultrasound images generated by the two-dimensional image generation unit 31 are sequentially held in the image memory 32, under the control of the apparatus control unit 36. As a result, the plurality of two-dimensional ultrasound images with different angles or positions of the scanning plane are held in the image memory 32.

Next, in the three-dimensional image processing unit 35, various kinds of processing for generating the three-dimensional ultrasound image of the examination location of the subject are performed using the plurality of two-dimensional ultrasound images held in the image memory 32, under the control of the apparatus control unit 36.

That is, by the tissue layer detection unit 41, each of the plurality of two-dimensional ultrasound images stored in the image memory 32 is analyzed, and a tissue layer in a range from the body surface of the examination location of the subject to a predetermined depth in each two-dimensional ultrasound image is detected (Step S12).

Next, by the normal vector calculation unit 42, a normal vector perpendicular to a tissue plane in the three-dimensional space is calculated on the basis of the tissue layer detected by the tissue layer detection unit 41 (Step S13).

Then, by the three-dimensional image generation unit 43, the three-dimensional ultrasound image corrected such that the tissue plane is horizontal is generated on the basis of the plurality of two-dimensional ultrasound images stored in the image memory 32 and the normal vector calculated by the normal vector calculation unit 42 (Step S14).

Next, by the display control unit 33, under the control of the apparatus control unit 36, the predetermined processing is performed on the three-dimensional ultrasound image generated by the three-dimensional image generation unit 43, and the processed three-dimensional ultrasound image (static image) is displayed on the monitor 34 (Step S15).

Similarly, setting a plurality of two-dimensional ultrasound images with different angles or positions of the scanning plane as one set, generating a next set of a plurality of two-dimensional ultrasound images, generating a next three-dimensional ultrasound image using the next set of the plurality of two-dimensional ultrasound images, and displaying the next three-dimensional ultrasound image is displayed on the monitor 34 are sequentially repeated. As a result, a video of the three-dimensional ultrasound images is displayed on the monitor 34.

In the ultrasound diagnostic apparatus of the present embodiment, the tissue layer of each of the plurality of two-dimensional ultrasound images is detected, the normal vector perpendicular to the tissue plane in the three-dimensional space is calculated, and the three-dimensional ultrasound image corrected such that the tissue plane is horizontal is generated on the basis of the plurality of two-dimensional ultrasound images and the normal vector. As a result, even in a case where the ultrasound probe 1 is in contact with the examination location of the subject in an inclined manner, the three-dimensional ultrasound image in which the inclination of the tissue plane corresponding to the inclination of the ultrasound probe 1, that is, the inclination of the three-dimensional ultrasound image is corrected can be generated.

The tissue layer detection unit 41 may change the range from the body surface of the examination location of the subject at the time of detecting the tissue layer to the predetermined depth, according to at least one of the examination location, the body type of the subject, or the like. For example, in a case where the examination location is a lower limb, the detection may be performed to a deeper depth than in a case where the examination location is an upper limb, and in a case of an obese subject the detection may be performed to a deeper depth than in a case of a thin subject. As a result, the tissue layer in an appropriate range can be detected according to the examination location, the body type of the subject, and the like.

The method of setting the depth range detected by the tissue layer detection unit 41 is not particularly limited, but for example, the depth range to be detected may be set for each preset in advance, and the depth range may be set according to the preset selected by the user; information on the body weight of the subject and the like may be set in advance, and the depth range may be calculated and set on the basis of the information; or the depth range itself may be manually set by the user.

Figure 12A:
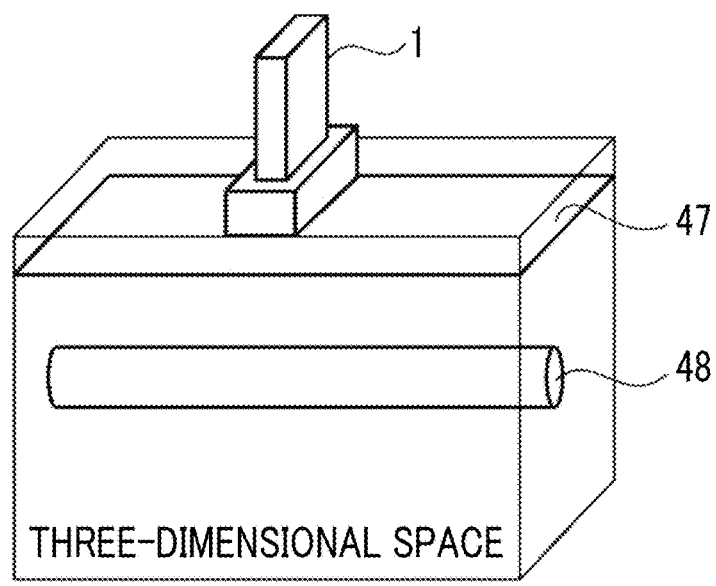
FIG. 12A is a conceptual diagram of an embodiment illustrating a state in which an ultrasound probe is in contact with a body surface perpendicularly.
Figure 12B:
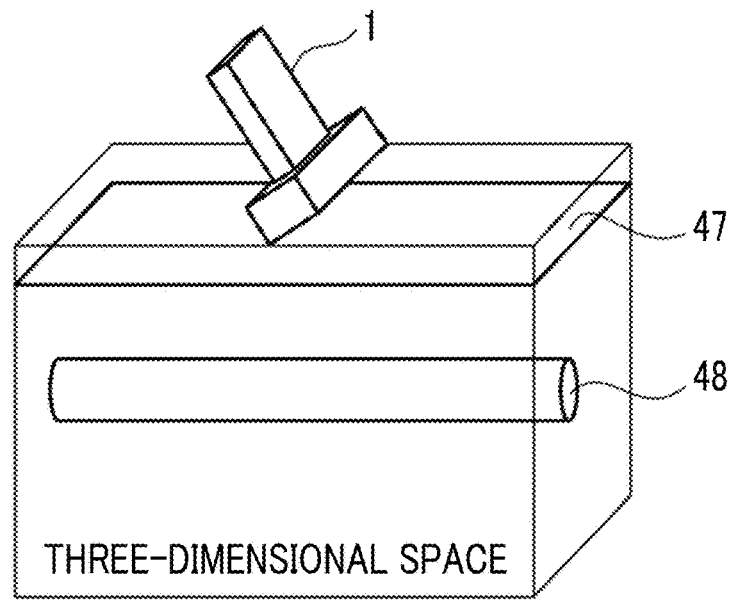
FIG. 12B is a conceptual diagram of an embodiment illustrating a state in which an ultrasound probe is in contact with a body surface in an inclined manner.

In addition, in a case where the three-dimensional ultrasound image is displayed, as illustrated in FIGS. 12A and 12B, the posture image indicating the posture of the ultrasound probe 1 with respect to the examination location may be displayed on the monitor 34. In FIGS. 12A and 12B, the tissue layer 47 and the blood vessel 48 are illustrated.

In this case, the posture image is generated on the basis of the normal vector by the posture image generation unit 44, and the three-dimensional ultrasound image and the posture image are displayed on the monitor 34 by the display control unit 33. For example, as illustrated in FIGS. 12A and 12B, as the posture image, an icon image indicating the posture of the ultrasound probe 1 is displayed on the monitor 34 in a state of being in contact with the body surface of the subject in the three-dimensional ultrasound image.

FIG. 12A illustrates a state in which the icon image of the ultrasound probe 1 is in contact with the body surface perpendicularly. In this case, since the plane of the tissue layer 47 is horizontal, the three-dimensional ultrasound image is generated without correcting the inclination of the plane of the tissue layer 47, and is displayed on the monitor 34.

On the other hand, FIG. 12B illustrates a state in which the icon image of the ultrasound probe 1 is in contact with the body surface in an inclined manner. In this case, actually, the plane of the tissue layer 47 is not horizontal and is inclined, the three-dimensional ultrasound image corrected such that the plane of the tissue layer 47 is horizontal is generated, and is displayed on the monitor 34.

As a result, it is possible for the user to visually check whether the ultrasound probe 1 is in contact with the body surface perpendicularly or in contact with the body surface in an inclined manner.

Even in a case where the ultrasound probe 1 is in contact with the body surface in an inclined manner, in a case where a relatively large pressure is applied to the examination location via the ultrasound probe 1, the subcutaneous tissue of the examination location is pressed so that the tissue layer is horizontal with respect to the ultrasound probe 1, but actually, the deep portion of the subcutaneous tissue is in a state of being inclined according to the inclination of the ultrasound probe 1. In this case, since the inclination of the ultrasound probe 1, that is, the inclination of the tissue plane cannot be accurately detected, there is a possibility that the correction of the inclination of the tissue plane is not accurately performed.

Accordingly, in a case where the pressure applied to the examination location via the ultrasound probe 1 is detected by the pressure sensor 15 attached to the ultrasound probe 1, and the pressure detected by the pressure sensor 15 is equal to or greater than a predetermined pressure, the notification unit 45 may notify user of the possibility that the tissue plane in the three-dimensional ultrasound image is not corrected to be horizontal. As a result, it is possible for the user to know the possibility that the correction of the inclination of the tissue plane is not correctly performed.

In addition, in a case where the tissue layer is not detected by the tissue layer detection unit 41, the notification unit 45 may notify the user that the tissue layer is not detected. As a result, it is possible for the user to know that the tissue layer is not detected, that is, the ultrasound probe 1 is not correctly in contact with the examination location of the subject, and accordingly, the ultrasound probe 1 can be correctly in contact with the examination location again.

Furthermore, in a case where the three-dimensional ultrasound image corrected such that the tissue plane is horizontal is generated, the notification unit 45 may notify the user that the tissue plane in the three-dimensional ultrasound image is corrected to be horizontal. As a result, it is possible for the user to know that the inclination of the tissue plane in the three-dimensional ultrasound image is corrected, that is, the ultrasound probe 1 is actually in contact with the examination location of the subject in an inclined manner.

Depending on the examination location, the purpose of the examination, and the like, in some cases, the user intentionally wants the ultrasound probe 1 to be in contact with the examination location of the subject in an inclined manner. Accordingly, the user may switch whether or not to correct the inclination of the tissue plane.

In this case, the correction on state, that is, whether the three-dimensional image generation unit 43 generates a three-dimensional ultrasound image corrected such that the tissue plane is horizontal on the basis of the normal vector and the correction off state, that is, whether the three-dimensional image generation unit 43 generates a three-dimensional ultrasound image regardless of the normal vector are switched by the image switching unit 46 in response to an instruction from the user. As a result, it is possible for the user to arbitrarily switch whether to correct the inclination of the tissue plane.

In a case of switching between the correction on state and the correction off state, the switching may be instantaneously performed, or the switching may be gradually performed over a certain period of time. In a case of instantaneous switching, since the inclination of the tissue plane, that is, the inclination of the three-dimensional ultrasound image is instantaneously switched, the screen of the monitor 34 may flicker and may be difficult to see in some cases. On the contrary, by slowly performing switching over a certain period of time, it is possible to suppress screen flicker and improve visibility, and it is possible to check the inclination of the tissue plane, that is, the inclination of the ultrasound probe 1.

Figure 13:
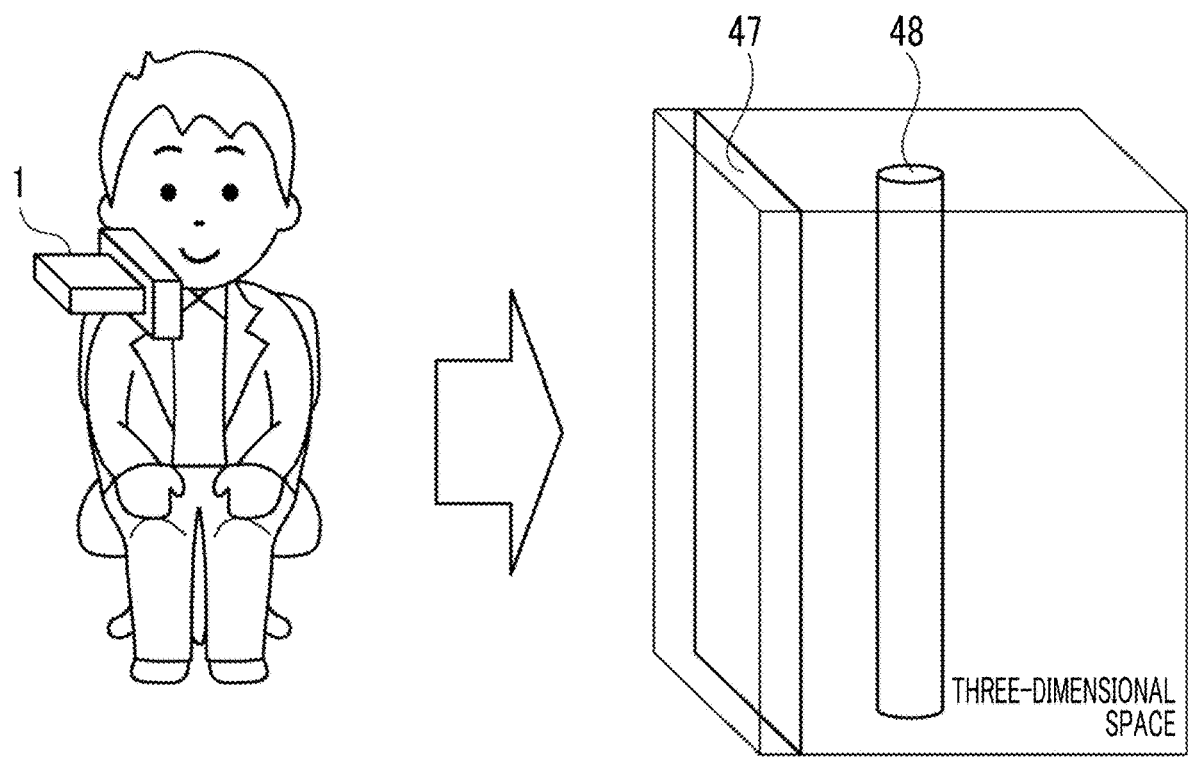
FIG. 13 is a conceptual diagram of another embodiment illustrating a tissue layer and a blood vessel in a three-dimensional space.
Figure 14A:
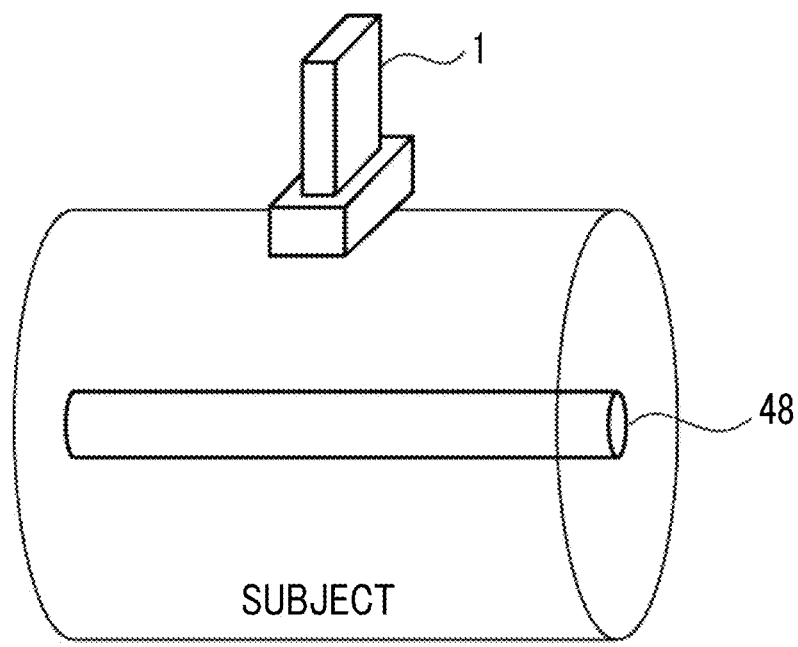
FIG. 14A is a conceptual diagram of an embodiment illustrating a blood vessel in a subject and a blood vessel in a three-dimensional space.
Figure 14A:
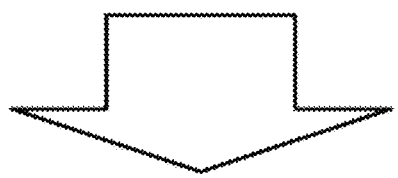
Figure 14A:
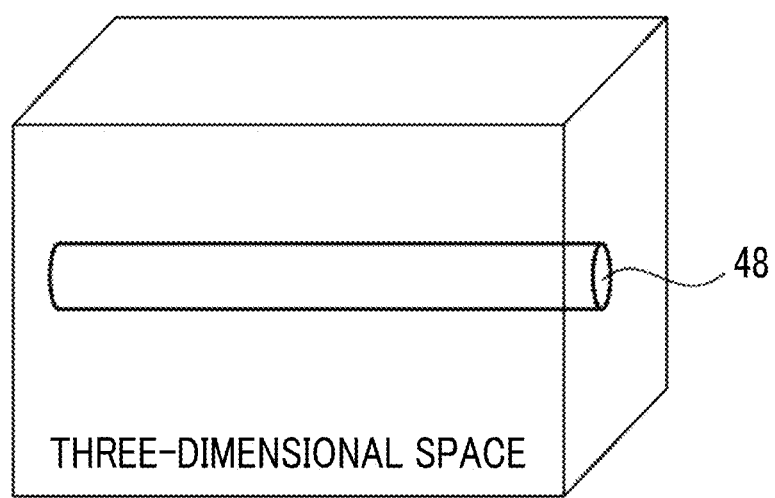
Figure 14B:
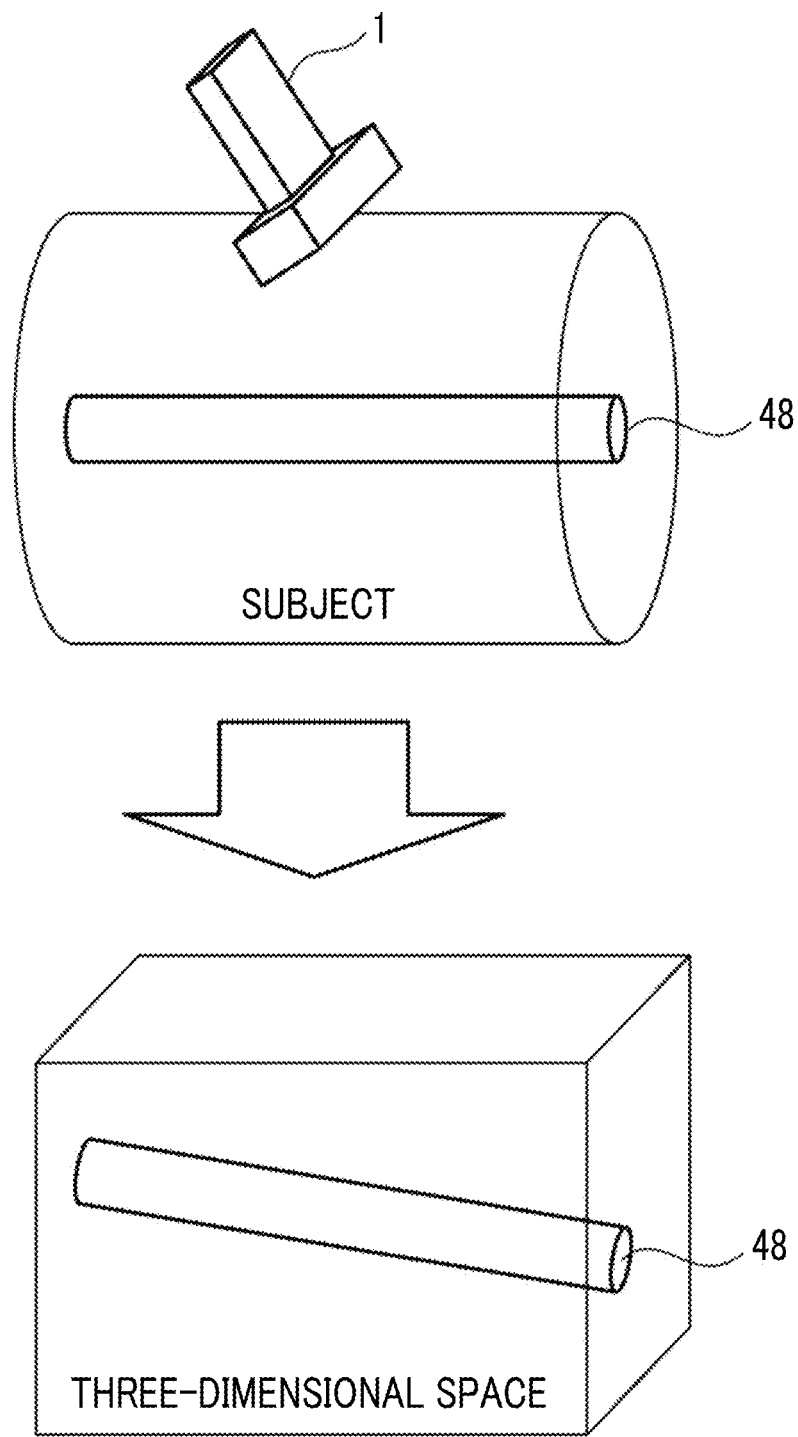
FIG. 14B is a conceptual diagram of another embodiment illustrating a blood vessel in a subject and a blood vessel in a three-dimensional space.
Figure 15:
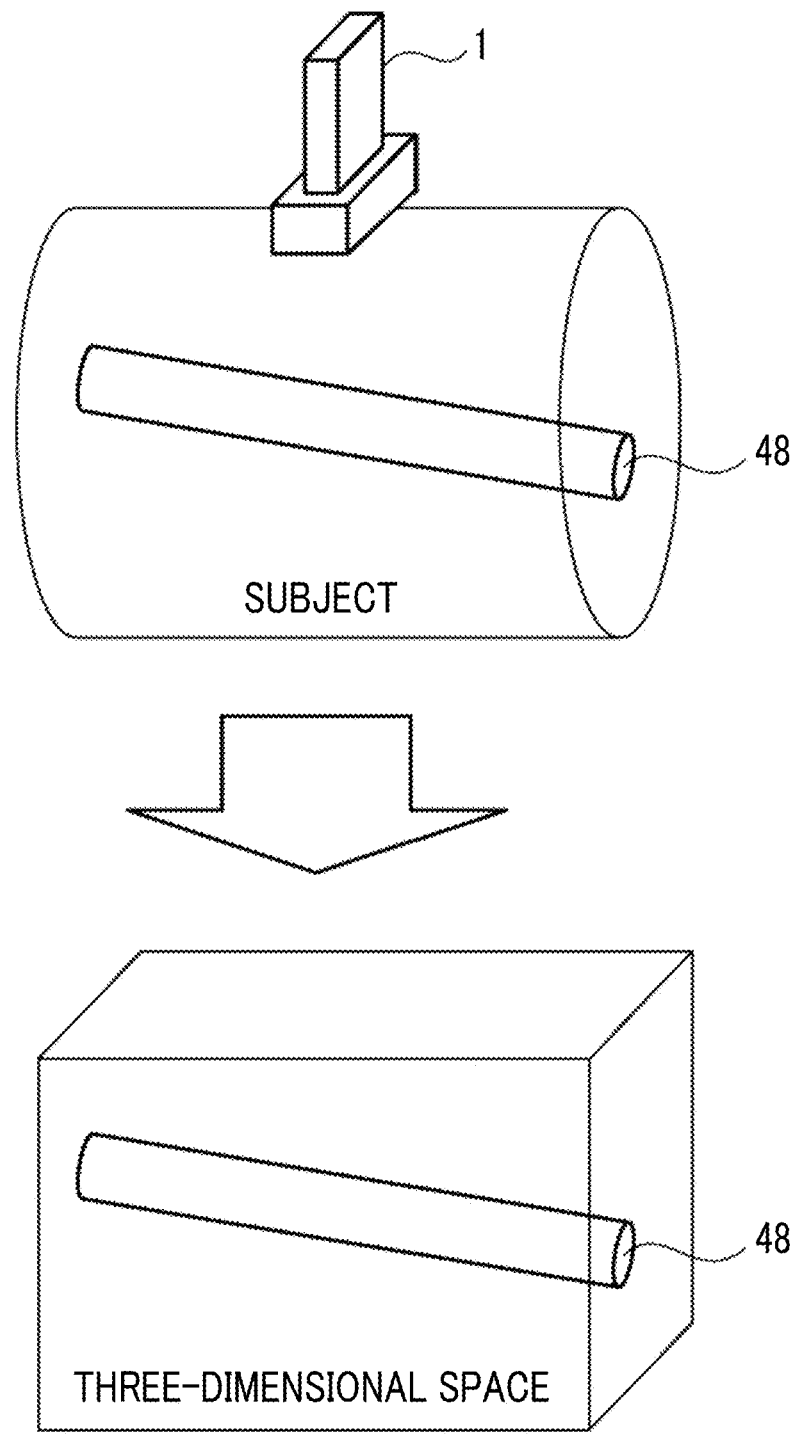
FIG. 15 is a conceptual diagram of another embodiment illustrating a blood vessel in a subject and a blood vessel in a three-dimensional space.

It is conceivable that the user may want to change the display direction of the three-dimensional ultrasound image to another display direction instead of always setting the display direction to the horizontal direction. For example, as illustrated in FIG. 13, in a state where the subject is sitting on a chair, in a case where the ultrasound probe 1 is brought into contact with the neck of the subject in a state where the azimuth direction is oriented in the horizontal direction, the display direction of the three-dimensional ultrasound image may be changed such that the same display direction as the posture of the subject, that is, the plane of the tissue layer 47 is the vertical direction. In FIG. 13, the tissue layer 47 and the blood vessel 48 are illustrated. In addition, it is conceivable that each user has various needs and preferences regarding the display direction of the three-dimensional ultrasound image, such as a preference for looking down from above, a preference for looking from an oblique angle.

In order meet the needs and preferences of the user, after the three-dimensional ultrasound image is displayed on the monitor 34, in a case where the display direction of the three-dimensional ultrasound image is changed in response to the instruction from the user, the three-dimensional image generation unit 43 stores the normal vector corresponding to the three-dimensional ultrasound image of which the display direction is changed. Then, in a case of generating subsequent three-dimensional ultrasound images, the three-dimensional image generation unit 43 rotates the display direction of the three-dimensional ultrasound image such that the normal vector corresponding to the three-dimensional ultrasound image is aligned with the normal vector corresponding to the three-dimensional ultrasound image of which the display direction stored by the three-dimensional image generation unit 43 is changed.

As a result, even in a case where the display direction of the three-dimensional ultrasound image is changed, as in the case where the display direction of the three-dimensional ultrasound image is the horizontal direction, the three-dimensional ultrasound image in which the inclination of the tissue plane is corrected can be generated and displayed on the monitor 34.

The present invention is not limited to a stationary ultrasound diagnostic apparatus, and can be similarly applied to a portable ultrasound diagnostic apparatus in which an apparatus main body 3 is realized by a laptop terminal device, and a handheld ultrasound diagnostic apparatus in which an apparatus main body 3 is realized by a handheld terminal device such as a smartphone or a tablet personal computer (PC).

The ultrasound probe 1 and the apparatus main body 3 may be connected in a wired or wireless manner.

Further, the entire two-dimensional image generation unit 31 or only the signal processing unit 16 may be provided on the ultrasound probe 1 side, or provided on the apparatus main body 3 side.

In the apparatus of the embodiment of the present invention, the hardware configurations of the processing units executing various kinds of processing such as the transmission and reception circuit 14, the two-dimensional image generation unit 31, the display control unit 33, the three-dimensional image processing unit 35, and the apparatus control unit 36 may be dedicated hardware, or may be various processors or computers that execute programs.

The various processors include a central processing unit (CPU) as a general-purpose processor executing software (program) and functioning as various processing units, a programmable logic device (PLD) as a processor of which the circuit configuration can be changed after manufacturing such as a field programmable gate array (FPGA), and a dedicated electric circuit as a processor having a circuit configuration designed exclusively for executing specific processing such as an application specific integrated circuit (ASIC).

One processing unit may be configured by one of the various processors or may be configured by a combination of the same or different kinds of two or more processors, for example, a combination of a plurality of FPGAs or a combination of an FPGA and a CPU). Further, a plurality of processing units may be configured by one of various processors, or two or more of a plurality of processing units may be collectively configured by using one processor.

For example, there is a form where one processor is configured by a combination of one or more CPUs and software as typified by a computer, such as a server and a client, and this processor functions as a plurality of processing units. Further, there is a form where a processor realizing the functions of the entire system including a plurality of processing units by one integrated circuit (IC) chip as typified by a system on chip (SoC) or the like is used.

Furthermore, the hardware configurations of these various processors are more specifically electric circuitry where circuit elements, such as semiconductor elements, are combined.

The method of the embodiment of the present invention can be carried out, for example, by a program for causing a computer to execute each step of the method. Further, a computer-readable recording medium in which this program is recorded can also be provided.

The present invention has been described in detail, but the present invention is not limited to the above-described embodiments, and various improvements and changes may be made within a range not departing from the scope of the present invention.

EXPLANATION OF REFERENCES

1: ultrasound probe
3: apparatus main body
11: transducer array
14: transmission and reception circuit
15: pressure sensor
16: signal processing unit
17: image processing unit
18: DSC
31: two-dimensional image generation unit
32: image memory
33: display control unit
34: monitor
35: three-dimensional image processing unit
36: apparatus control unit
37: input device
39: processor
41: tissue layer detection unit
42: normal vector calculation unit
43: three-dimensional image generation unit
44: posture image generation unit
45: notification unit
46: image switching unit
47: tissue layer
48: blood vessel
51: pulser
52: amplification unit
53: AD conversion unit
54: beam former

What is claimed is:
1. An ultrasound diagnostic apparatus comprising:
an ultrasound probe having a transducer array;
a monitor; and
a processor, wherein the processor is configured to:

generate a plurality of two-dimensional ultrasound images from reception signals obtained by sequentially performing transmission and reception of ultrasound beams while shifting an angle or a position of a scanning plane, using the transducer array in a state where the ultrasound probe is in contact with an examination location of a subject;

analyze each of the plurality of two-dimensional ultrasound images to detect a tissue layer in a range from a body surface of the examination location to a predetermined depth;

calculate a normal vector perpendicular to a tissue plane in a three-dimensional space on the basis of the tissue layer;

generate a three-dimensional ultrasound image corrected such that the tissue plane is horizontal by aligning the normal vector in a vertical direction on the basis of the plurality of two-dimensional ultrasound images and the normal vector; and display the three-dimensional ultrasound image on the monitor.

2. The ultrasound diagnostic apparatus according to claim 1,
wherein the processor changes the range from the body surface of the examination location to the predetermined depth in a case of detecting the tissue layer according to the examination location.

3. The ultrasound diagnostic apparatus according to claim 2,
wherein the processor changes the range from the body surface of the examination location to the predetermined depth in a case of detecting the tissue layer according to a body type of the subject.

4. The ultrasound diagnostic apparatus according to claim 2,
wherein the processor is configured to generate a posture image indicating a posture of the ultrasound probe with respect to the examination location, on the basis of the normal vector, and
wherein the processor displays the three-dimensional ultrasound image and the posture image on the monitor.

5. The ultrasound diagnostic apparatus according to claim 4,
wherein the posture image is an icon image that indicates the posture of the ultrasound probe, or a line image that indicates an inclination of the ultrasound probe and extends along a central axis extending along a longitudinal direction of the ultrasound probe.

6. The ultrasound diagnostic apparatus according to claim 2, further comprising:
a pressure sensor that is attached to the ultrasound probe, and detects a pressure applied to the examination location via the ultrasound probe; and
wherein, in a case where the pressure detected by the pressure sensor is equal to or greater than a predetermined pressure, the processor is configured to notify a user of a possibility that the tissue plane in the three-dimensional ultrasound image is not corrected to be horizontal.

7. The ultrasound diagnostic apparatus according to claim 2,
wherein, in a case where the three-dimensional ultrasound image corrected such that the tissue plane is horizontal is generated, the processor is configured to notify a user that the tissue plane in the three-dimensional ultrasound image is corrected to be horizontal.

8. The ultrasound diagnostic apparatus according to claim 2,
wherein, in a case where the tissue layer is not detected, the processor is configured to notify a user that the tissue layer is not detected.

9. The ultrasound diagnostic apparatus according to claim 2,
wherein the processor is configured to switch between whether the processor generates the three-dimensional ultrasound image corrected such that the tissue plane is horizontal on the basis of the normal vector and whether the processor generates the three-dimensional ultrasound image regardless of the normal vector, in response to an instruction from a user.

10. The ultrasound diagnostic apparatus according to claim 2,
wherein after the three-dimensional ultrasound image is displayed on the monitor, in a case where a display direction of the three-dimensional ultrasound image is changed in response to an instruction from a user, the processor stores a normal vector corresponding to the three-dimensional ultrasound image of which the display direction is changed, and rotates the display direction of the three-dimensional ultrasound image such that the normal vector corresponding to the three-dimensional ultrasound image is aligned with the normal vector corresponding to the three-dimensional ultrasound image of which the display direction is changed.

11. The ultrasound diagnostic apparatus according to claim 1,
wherein the processor changes the range from the body surface of the examination location to the predetermined depth in a case of detecting the tissue layer according to a body type of the subject.

12. The ultrasound diagnostic apparatus according to claim 11,
wherein the processor is configured to generate a posture image indicating a posture of the ultrasound probe with respect to the examination location, on the basis of the normal vector,
wherein the processor displays the three-dimensional ultrasound image and the posture image on the monitor.

13. The ultrasound diagnostic apparatus according to claim 1,
wherein the processor is configured to generate a posture image indicating a posture of the ultrasound probe with respect to the examination location, on the basis of the normal vector, and
wherein the processor displays the three-dimensional ultrasound image and the posture image on the monitor.

14. The ultrasound diagnostic apparatus according to claim 13,
wherein the posture image is an icon image that indicates the posture of the ultrasound probe, or a line image that indicates an inclination of the ultrasound probe and extends along a central axis extending along a longitudinal direction of the ultrasound probe.

15. The ultrasound diagnostic apparatus according to claim 1, further comprising:
a pressure sensor that is attached to the ultrasound probe, and detects a pressure applied to the examination location via the ultrasound probe,
wherein, in a case where the pressure detected by the pressure sensor is equal to or greater than a predetermined pressure, the processor is configured to notify a user of a possibility that the tissue plane in the three-dimensional ultrasound image is not corrected to be horizontal.

16. The ultrasound diagnostic apparatus according to claim 1,
wherein, in a case where the three-dimensional ultrasound image corrected such that the tissue plane is horizontal is generated, the processor is configured to notify a user that the tissue plane in the three-dimensional ultrasound image is corrected to be horizontal.

17. The ultrasound diagnostic apparatus according to claim 1,
wherein, in a case where the tissue layer is not detected, the processor is configured to notify a user that the tissue layer is not detected.

18. The ultrasound diagnostic apparatus according to claim 1,
wherein the processor is configured to switch between whether the processor generates the three-dimensional ultrasound image corrected such that the tissue plane is horizontal on the basis of the normal vector and whether the processor generates the three-dimensional ultrasound image regardless of the normal vector, in response to an instruction from a user.

19. The ultrasound diagnostic apparatus according to claim 1,
wherein after the three-dimensional ultrasound image is displayed on the monitor, in a case where a display direction of the three-dimensional ultrasound image is changed in response to an instruction from a user, the processor stores a normal vector corresponding to the three-dimensional ultrasound image of which the display direction is changed, and rotates the display direction of the three-dimensional ultrasound image such that the normal vector corresponding to the three-dimensional ultrasound image is aligned with the normal vector corresponding to the three-dimensional ultrasound image of which the display direction is changed.

20. A control method of an ultrasound diagnostic apparatus, the control method comprising:
generating a plurality of two-dimensional ultrasound images from reception signals obtained by sequentially performing transmission and reception of ultrasound beams while shifting an angle or a position of a scanning plane, using a transducer array of an ultrasound probe in a state where the ultrasound probe is in contact with an examination location of a subject, via a processor;
analyzing each of the plurality of two-dimensional ultrasound images to detect a tissue layer in a range from a body surface of the examination location to a predetermined depth, via the processor;
calculating a normal vector perpendicular to a tissue plane in a three-dimensional space on the basis of the tissue layer, via the processor;
generating a three-dimensional ultrasound image corrected such that the tissue plane is horizontal by aligning the normal vector in a vertical direction on the basis of the plurality of two-dimensional ultrasound images and the normal vector, via the processor; and
displaying the three-dimensional ultrasound image on a monitor, via the processor.

* * * * *